(12) United States Patent
Attar et al.

(10) Patent No.: US 9,654,696 B2
(45) Date of Patent: May 16, 2017

(54) SPATIALLY DIFFERENTIATED LUMINANCE IN A MULTI-LENS CAMERA

(75) Inventors: Ziv Attar, Zihron Yaakov (IL); Chen Aharon-Attar, Zihron Yaakov (IL)

(73) Assignee: LinX Computation Imaging Ltd., Zichron Yaakov (IL)

( * ) Notice: Subject to any disclaimer, the term of this patent is extended or adjusted under 35 U.S.C. 154(b) by 0 days.

(21) Appl. No.: 13/881,115

(22) PCT Filed: Oct. 24, 2011

(86) PCT No.: PCT/NL2011/050722
§ 371 (c)(1),
(2), (4) Date: Jul. 8, 2013

(87) PCT Pub. No.: WO2012/057619
PCT Pub. Date: May 3, 2012

(65) Prior Publication Data
US 2014/0009646 A1    Jan. 9, 2014

Related U.S. Application Data

(60) Provisional application No. 61/406,148, filed on Oct. 24, 2010.

(51) Int. Cl.
*H04N 9/07* (2006.01)
*H04N 5/217* (2011.01)
(Continued)

(52) U.S. Cl.
CPC ......... *H04N 5/2351* (2013.01); *H04N 5/2226* (2013.01); *H04N 5/2253* (2013.01);
(Continued)

(58) Field of Classification Search
USPC .......... 348/54, 208.11, 224.1, 267, 271, 273, 348/290, 291, 336, 342; 359/362, 363,
(Continued)

(56) References Cited

U.S. PATENT DOCUMENTS

| | | | |
|---|---|---|---|
| 4,890,905 A | | 1/1990 | Van Rosmalen et al. |
| 5,347,340 A | * | 9/1994 | Tsukada .................. G02B 7/28 396/93 |
| 6,115,065 A | | 9/2000 | Yadid-Pecht et al. |
| 6,765,617 B1 | | 7/2004 | Tangen |
| 6,773,638 B2 | | 8/2004 | Kloosterboer et al. |
| 6,809,766 B1 | | 10/2004 | Krymski et al. |

(Continued)

FOREIGN PATENT DOCUMENTS

| | | |
|---|---|---|
| EP | 1206126 A2 | 5/2002 |
| EP | 2336816 A2 | 6/2011 |

(Continued)

OTHER PUBLICATIONS

PCT International Search Report, PCT Application No. PCT/NL2011/050722, Apr. 16, 2012, 7 pages.

(Continued)

*Primary Examiner* — Lin Ye
*Assistant Examiner* — Euel Cowan
(74) *Attorney, Agent, or Firm* — Blank Rome LLP

(57) ABSTRACT

Spatial resolution can be improved in multi-lens digital cameras. Each lens can have the same or similar field of view, but can be associated with different modulation transfer functions defining varying sharpness based on location within the field of view. The image information received from each lens can be combined to form an image based on the sharpness of the image information received from each lens.

20 Claims, 15 Drawing Sheets

(51) Int. Cl.

| | | |
|---|---|---|
| *G03B 13/00* | (2006.01) | |
| *H04N 5/235* | (2006.01) | |
| *H04N 5/222* | (2006.01) | |
| *H04N 5/232* | (2006.01) | |
| *H04N 5/262* | (2006.01) | |
| *H04N 9/04* | (2006.01) | |
| *H04N 5/353* | (2011.01) | |
| *H04N 5/225* | (2006.01) | |
| *H04N 9/097* | (2006.01) | |
| *H04N 5/265* | (2006.01) | |

(52) U.S. Cl.
CPC ......... *H04N 5/2254* (2013.01); *H04N 5/2258* (2013.01); *H04N 5/232* (2013.01); *H04N 5/23229* (2013.01); *H04N 5/23232* (2013.01); *H04N 5/262* (2013.01); *H04N 5/265* (2013.01); *H04N 5/2621* (2013.01); *H04N 5/3532* (2013.01); *H04N 9/045* (2013.01); *H04N 9/097* (2013.01)

(58) Field of Classification Search
USPC ........................................ 359/373, 375, 376
See application file for complete search history.

(56) References Cited

U.S. PATENT DOCUMENTS

| | | |
|---|---|---|
| 6,898,331 B2 | 5/2005 | Tiana |
| 6,980,248 B1 | 12/2005 | Suda |
| 7,151,259 B2 | 12/2006 | Koch et al. |
| 7,199,348 B2 | 4/2007 | Olsen |
| 7,224,384 B1 | 5/2007 | Iddan |
| 7,233,359 B2 | 6/2007 | Suda |
| 7,262,799 B2 | 8/2007 | Suda |
| 7,564,019 B2 | 7/2009 | Olsen |
| 7,620,309 B2 | 11/2009 | Georgiev |
| 7,718,940 B2 | 5/2010 | Hirasawa |
| 7,916,181 B2 * | 3/2011 | Nilehn ...................... G06T 5/50 |
| | | 348/222.1 |
| 7,932,941 B2 | 4/2011 | Hayasaka |
| 8,023,016 B2 | 9/2011 | Iijima |
| 8,049,806 B2 | 11/2011 | Feldman |
| 8,228,417 B1 | 7/2012 | Georgiev |
| 8,259,212 B2 | 9/2012 | Brady |
| 8,290,358 B1 | 10/2012 | Georgiev |
| 8,315,476 B1 | 11/2012 | Georgiev |
| 8,345,144 B1 | 1/2013 | Georgiev |
| 8,436,909 B2 | 5/2013 | Farina |
| 8,471,920 B2 | 6/2013 | Georgiev |
| 8,514,491 B2 | 8/2013 | Duparre |
| 8,611,693 B2 | 12/2013 | Intwala |
| 8,629,390 B2 | 1/2014 | Olsen |
| 8,749,694 B2 | 6/2014 | Georgiev |
| 8,760,558 B2 | 6/2014 | Morita |
| 8,817,015 B2 | 8/2014 | Georgiev |
| 8,885,059 B1 | 11/2014 | Venkataraman |
| 2001/0026322 A1 | 10/2001 | Takahashi |
| 2002/0067416 A1 | 6/2002 | Yoneda et al. |
| 2002/0089596 A1 | 7/2002 | Suda |
| 2002/0122124 A1 | 9/2002 | Suda |
| 2003/0108240 A1 | 6/2003 | Gutta |
| 2003/0234907 A1 | 12/2003 | Kawai |
| 2004/0047518 A1 | 3/2004 | Tiana |
| 2004/0080661 A1 | 4/2004 | Afsenius et al. |
| 2004/0109004 A1 | 6/2004 | Bastos et al. |
| 2004/0201748 A1* | 10/2004 | Goldstein ............ H04N 1/3873 |
| | | 348/231.99 |
| 2005/0052751 A1 | 3/2005 | Liu |
| 2005/0128323 A1 | 6/2005 | Choi |
| 2005/0128335 A1 | 6/2005 | Kolehmainen |
| 2005/0128509 A1 | 6/2005 | Tokkonen |
| 2005/0134699 A1 | 6/2005 | Nagashima |
| 2005/0151866 A1 | 7/2005 | Ando |
| 2005/0160112 A1 | 7/2005 | Makela |
| 2005/0225654 A1 | 10/2005 | Feldman et al. |
| 2005/0259169 A1 | 11/2005 | Ito |
| 2005/0270395 A1 | 12/2005 | Yoneda et al. |
| 2006/0003328 A1 | 1/2006 | Grossberg |
| 2006/0055811 A1 | 3/2006 | Frtiz |
| 2006/0108505 A1* | 5/2006 | Gruhlke ................ G03B 17/00 |
| | | 250/208.1 |
| 2006/0125936 A1 | 6/2006 | Gruhike |
| 2006/0193509 A1 | 8/2006 | Criminisi et al. |
| 2007/0075218 A1 | 4/2007 | Gates |
| 2007/0091197 A1 | 4/2007 | Okayama |
| 2007/0153086 A1* | 7/2007 | Usui ...................... H04N 5/235 |
| | | 348/153 |
| 2007/0177004 A1* | 8/2007 | Kolehmainen ...... H04N 5/2254 |
| | | 348/42 |
| 2007/0189748 A1 | 8/2007 | Drimbarean et al. |
| 2007/0211164 A1 | 9/2007 | Olsen et al. |
| 2007/0252074 A1 | 11/2007 | Ng |
| 2007/0252908 A1 | 11/2007 | Kolehmainen |
| 2007/0258006 A1 | 11/2007 | Olsen et al. |
| 2008/0068452 A1 | 3/2008 | Nakao |
| 2008/0079839 A1* | 4/2008 | Sung ........................ G02B 7/38 |
| | | 348/345 |
| 2008/0084486 A1 | 4/2008 | Enge |
| 2008/0218611 A1 | 9/2008 | Parulski et al. |
| 2008/0219493 A1 | 9/2008 | Tadmor |
| 2008/0240508 A1 | 10/2008 | Nakao et al. |
| 2008/0278610 A1 | 11/2008 | Boettinger |
| 2009/0021612 A1 | 1/2009 | Hamilton |
| 2009/0103792 A1* | 4/2009 | Rahn .................. G01N 21/4795 |
| | | 382/131 |
| 2009/0140131 A1 | 6/2009 | Utagawa |
| 2009/0262987 A1 | 10/2009 | Ioffe et al. |
| 2009/0321861 A1 | 12/2009 | Oliver et al. |
| 2010/0020078 A1 | 1/2010 | Shpunt |
| 2010/0021064 A1 | 1/2010 | Lee et al. |
| 2010/0039713 A1 | 2/2010 | Lusinchi et al. |
| 2010/0052192 A1 | 3/2010 | Hasegawa et al. |
| 2010/0085468 A1 | 4/2010 | Park |
| 2010/0097491 A1 | 4/2010 | Farina |
| 2010/0117176 A1 | 5/2010 | Uekawa |
| 2010/0127157 A1 | 5/2010 | Tamaki et al. |
| 2010/0128137 A1 | 5/2010 | Guidash |
| 2010/0171866 A1 | 7/2010 | Brady |
| 2010/0253833 A1 | 10/2010 | Deever |
| 2010/0259607 A1* | 10/2010 | Kennedy ................ F41G 7/2253 |
| | | 348/113 |
| 2010/0283837 A1* | 11/2010 | Oohchida ............. G06T 7/0075 |
| | | 348/47 |
| 2011/0019048 A1 | 1/2011 | Raynor |
| 2011/0069189 A1 | 3/2011 | Venkataraman |
| 2011/0080487 A1 | 4/2011 | Venkataraman et al. |
| 2011/0122308 A1 | 5/2011 | Duparre |
| 2011/0134282 A1 | 6/2011 | Morita et al. |
| 2011/0157387 A1 | 6/2011 | Han |
| 2011/0242356 A1 | 10/2011 | Aleksic |
| 2012/0007942 A1* | 1/2012 | Michrowski ............ H04N 7/147 |
| | | 348/14.08 |
| 2012/0140100 A1 | 6/2012 | Shibazaki |
| 2013/0002928 A1 | 1/2013 | Imai |
| 2013/0121615 A1 | 5/2013 | Intwala |
| 2013/0128087 A1 | 5/2013 | Georgiev |
| 2013/0293744 A1 | 11/2013 | Attar |
| 2013/0308197 A1 | 11/2013 | Duparre |
| 2013/0321674 A1 | 12/2013 | Cote |
| 2013/0335598 A1 | 12/2013 | Gustavsson |
| 2013/0335621 A1 | 12/2013 | Attar |
| 2015/0234151 A1 | 8/2015 | Venkataraman |
| 2015/0235371 A1 | 8/2015 | Venkataraman |
| 2015/0296193 A1 | 10/2015 | Cote |

FOREIGN PATENT DOCUMENTS

| | | |
|---|---|---|
| JP | 2000 152281 A | 5/2000 |
| JP | 2001078212 A | 3/2001 |
| JP | 2002135795 A | 5/2002 |
| JP | 2002171430 A | 6/2002 |
| JP | 2005 109622 A | 4/2005 |

(56) References Cited

FOREIGN PATENT DOCUMENTS

| JP | 2005 303694 A | 10/2005 |
|---|---|---|
| JP | 2006246193 A | 9/2006 |
| JP | 2007 158825 A | 6/2007 |
| JP | 2008099329 A | 4/2008 |
| JP | 2010004090 A | 1/2010 |
| JP | 2011 109484 A | 6/2011 |
| WO | WO 00/22566 A1 | 4/2000 |
| WO | WO 03/049035 A2 | 6/2003 |
| WO | WO 2004/021264 A1 | 3/2004 |
| WO | WO 2004/027880 A2 | 4/2004 |
| WO | 2006039486 A2 | 4/2006 |
| WO | WO 2007/005714 A2 | 1/2007 |
| WO | WO 2008/085679 A1 | 7/2008 |
| WO | WO 2008/087652 A2 | 7/2008 |
| WO | WO 2009/123278 A1 | 10/2009 |
| WO | WO 2009/151903 A2 | 12/2009 |
| WO | WO 2010/059182 A1 | 5/2010 |
| WO | WO 2010/078563 A1 | 7/2010 |

OTHER PUBLICATIONS

PCT Written Opinion, PCT Application No. PCT/NL2011/050722, Apr. 16, 2012, 14 pages.
PCT International Search Report, PCT Application No. PCT/NL2011/050723, Apr. 20, 2012, 6 pages.
PCT Written Opinion, PCT Application No. PCT/NL2011/050723, Apr. 20, 2012, 12 pages.
PCT International Search Report, PCT Application No. PCT/NL2011/050724, Feb. 6, 2012, 4 pages.
PCT Written Opinion, PCT Application No. PCT/NL2011/050724, Feb. 6, 2012, 5 pages.
PCT International Search Report, PCT Application No. PCT/NL2011/050725, Feb. 1, 2012, 4 pages.
PCT Written Opinion, PCT Application No. PCT/NL2011/050725, Feb. 1, 2012, 10 pages.
PCT International Search Report, PCT Application No. PCT/US2011/050726, Mar. 29, 2012, 6 pages.
PCT Written Opinion, PCT Application No. PCT/US2011/050726, Mar. 29, 2012, 10 pages.
Mirotznik, M. et al., "A Practical Enhanced-Resolution Integrated Optical-Digital Imaging Camera," Proceedings of SPIE, Modeling and Simulation for Military Operations IV, Trevisani, D.A. (ed.), Jan. 2009, pp. 743806-1-743806-9, vol. 7348.
Horstmeyer, R. et al., "Flexible Multimodal Camera Using a Light Field Architecture," 2009 IEEE International Conference on Computational Photography (ICCP2009), IEEE, Apr. 16, 2009, pp. 1-8.
Horisaki, R. et al., "A Compound-Eye Imaging System with Irregular Lens-Array Arrangement," Proceedings of SPIE, Optics and Photonics for Information Processing II, Awwal, A.A.S. et al. (eds.), Aug. 13-14, 2008, pp. 70720G1-70720G-9, vol. 7072.

* cited by examiner

Red        Green        Blue

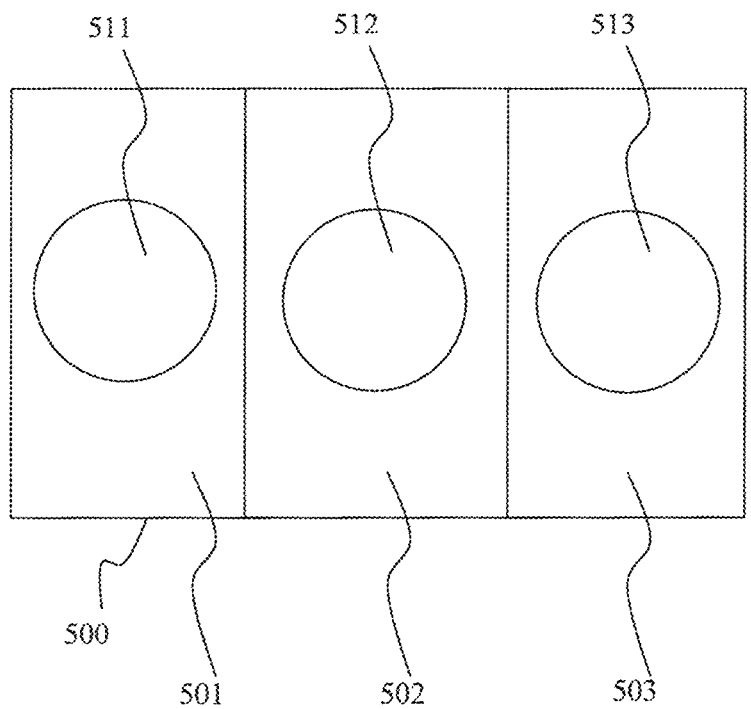
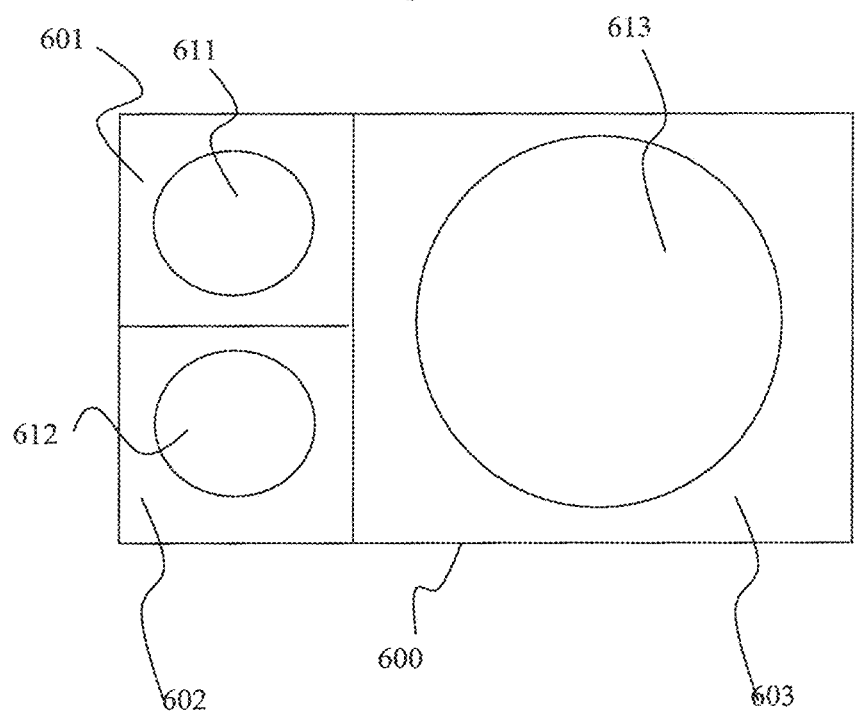

SPATIALLY DIFFERENTIATED LUMINANCE IN A MULTI-LENS CAMERA

CROSS REFERENCE TO RELATED APPLICATIONS

This application is a national phase application of PCT/NL2011/050722, entitled "System and Method for Imaging Using Multi Aperture Camera," filed on Oct. 24, 2011, which in turn claims priority to U.S. Provisional Application No. 61/406,148, filed on Oct. 24, 2010, the contents of which are all hereby incorporated by reference in their entirety.

BACKGROUND

Technical Field

This disclosure relates to a camera system, and more specifically, to a camera system with multiple lenses, each configured to capture luminance image data based on modulation transfer functions ("MTFs").

Description of the Related Art

An imaging system typically consists of an imaging lens and an image sensor. An imaging lens collects light emitted or reflected from objects in a scene and directs collected light upon the image sensor. An image sensor is a photosensitive device that converts light incident upon the image sensor during an image capture to an electronic signal representative of the captured light. To obtain color image data, a color filter array (such as a Bayer filter) is used in conjunction with the image sensor to separate between different spectral regions of the total light spectrum of the image being captured. Color filter arrays separate captured light into (for instance) green image planes, red image planes, and blue image planes.

Given an image sensor's active area dimension (the image sensor's "format") and the desired field of view, the focal length of a lens can be calculated. The size of the aperture of the lens can be set according to image sensor's photo sensitivity, exposure time, and noise level tolerance. The focal length divided by the aperture's size is called the "F-number," and indicates the ability of the lens to collect light. Lower F-Numbers are associated with more light being collected by the lens and directed upon the image sensor.

A phenomena caused by the use of color filter arrays is the appearance of color artifacts also caused by the spatial disposition of the different colors. For example, in a captured image of a white line 1 pixel deep on a black background, the white line will appear in various colors depending on the position of the light from the line incident upon the image sensor. Multi-lens systems can be implemented to reduce such artifacts, but can be accompanied by issues of increased system cost and complexity.

BRIEF DESCRIPTION OF THE DRAWINGS

The disclosed embodiments have other advantages and features which will be more readily apparent from the following detailed description of the invention and the appended claims, when taken in conjunction with the accompanying drawings, in which:

FIG. 5 illustrates a front view of a three lens camera using one rectangular image sensor divided in to three regions, according to one example embodiment.

FIG. 6 illustrates a front view of a three lens camera having one image sensor, one large lens and two smaller lenses, according to one example embodiment.

DETAILED DESCRIPTION

Figure 1:
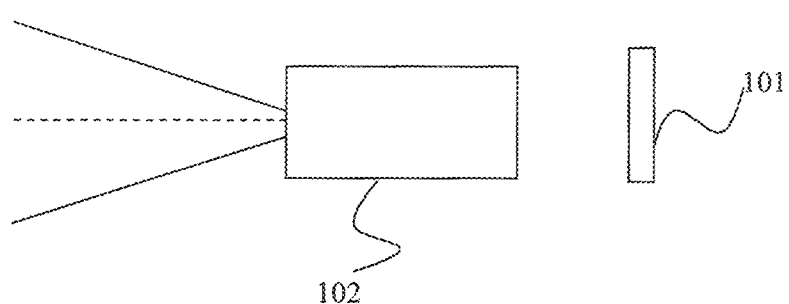
FIG. 1 illustrates a side view of a single lens camera, according to one example embodiment.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A multi-lens camera system can improve image luminance using various modulation transfer functions. Each lens in a camera system is associated with a different modulation transfer function. The term "multi-lens digital camera" or "multi-aperture digital camera" as used herein refers to a camera including more than one lens, each with an aperture and various lens elements. The term "modulation transfer function" as used herein refers to spatial resolution modulation (resolution variance as a function of location within a field of view). The term "spatial resolution" as used herein refers to the ability of a lens to create an image that can resolve details that have a size of 1/f, where f is the spatial resolution.

Spatially Differentiated Luminance Overview

Image spatial resolution can be improved by using a multi-aperture camera. In an aspect of the disclosure there is provided a system for imaging including a one or more imaging sensors; two or more lenses, each lens forms an initial image at a different location on the sensor or on the different sensors in the case of multiple sensors. According to an embodiment at least two of the apertures have the same field of view of the different imaging channels.

According to another embodiment of the multi-lens camera system, the different modulation transfer functions as a function of field are designed such to improve spatial resolution of different parts of the image at each imaging channel. In an embodiment the different modulation transfer functions are achieved by means of different optical properties of the lens elements in the different imaging channels, in which the different optical properties include lens shapes, lens thicknesses, air space thicknesses, lens materials and apertures dimensions.

According to another embodiment the different modulation transfer functions are achieved by introducing field curvature to two or more lenses of the imaging channels and different focusing of the said lenses. The benefit of introducing field curvature and different focusing can be seen in the aspect of increasing modulation at different parts of the image by using two or more lenses that share the same design except for the back focus.

The system may include one or more color filters integrated to the system. The system may include one or more polarized filters integrated to the system. The system may include one or more neutral density filters integrated to the system. In an embodiment of the invention at least one of the imaging channels includes a filter as mentioned before. In an embodiment of the multi-lens camera system, the imaging channels form an image on a single image sensor. Two or more initial images may have lower light intensity signal as compare to the other initial images. Two or more initial images may have higher light intensity signal as compare to the other initial images. In an embodiment of the multi-lens camera system, at least two of the imaging channels include a chromatic filter and in which at least one additional imaging channel has a broader spectral transmission than the said chromatic filter. This will result in the ability to create a color or monochrome image having special characteristics.

The system may include an algorithm for adding initial images to form a final image having higher dynamic range. The system may include at least two lenses which have a different F-Number. The system may also include least two lenses are focused to the same distance or two lenses which are focused to a different distance.

According to the multi-lens camera system there is provided a method for imaging which includes the steps of transmitting reflected or emitted light collected from a scene to an image sensor via at least two lenses, forming at least two images on different locations of the image sensor and processing at least two images received on the image sensor to form a complete image.

The method may also include the additional step of filtering the collected light so as to receive a colored image, the filtering may be color filtering, polarized filtering or neutral density filtering.

In one embodiment of the multi-lens camera system, there is also provided a method for improving image spatial resolution using the multi-lens camera system, which method comprises the following steps: 1. selecting the area of interest from each imaging channel, and 2. combining the thus selected areas into a final image. By using such a method it is possible to create a final image with higher resolution than the single images of the different imaging channels. Step 1 relates to selecting the areas in which the modulation is higher, and step 2 relates to forming a final image with higher modulation across the whole field of view.

In one embodiment, the method comprises the following steps: 1. selecting the area of interest from at least two images, 2. combining the thus selected areas into a composed luminance of the final image, 3. combining the chrominance of the final image from at least two differently chromatically filtered images, 4. combining the luminance of step 2 and chrominance of step 3 into a final color image.

Such a method enables the creation a final color image with higher resolution than the single images of the different imaging channels. Step 1 relates to selecting the areas in which the modulation is higher, step 2 relates to combining the said areas in to one luminance matrix having high modulation across the whole field of view, step 3 relates to creating chrominance information for all positions in the final image, and step 4 relates to combining the said chrominance matrix with the said luminance matrix into a color image having any known format. In the aforementioned methods, the areas of interest are of higher modulation. This will result in a combined luminance matrix that has higher modulation across the whole field of view.

In one embodiment, the method further includes the step of upscaling, i.e. in which before the step of combining the images of the different imaging channels the images of the different imaging channels are upscaled. The step of upscaling can take place in the direction x and y in which the scaling factor in x and in y may be of different magnitude. The effect of this will result in a final image with higher resolution than the resolution of the single imaging channels.

In one embodiment, a method for improving low light performance can be performed using the multi-lens camera system, including the following steps: 1. using the one or more images of said broader spectral chromatically filtered imaging channels to create the luminance of the final image, 2. combining the chrominance of the final image from at least two differently chromatically filtered images, 3. combining the luminance of step 1 and chrominance of step 2 into a final color image. The effect of these steps 1, 2 and 3 is that final image will demonstrate a higher signal to noise ratio.

In one embodiment, a method for selecting luminance for a final image can be performed using the multi-lens camera system, including the following steps: 1. determining the amount of light in a scene, 2. selecting the source of luminance for the final image according to the said amount of light, and 3. combining the selected sources of luminance to form the final image.

By using such a method it is possible to increase the signal to noise ration of the final image in low light conditions and increase the resolution of the final image in normal lighting conditions. Step 1 relates to relates to calculating the amount of light in a scene by using the exposure time and the pixels signal values in one or more of the imaging channels. Step 2 relates to making a selection between the broader spectrally filtered imaging which may be corrected for distortion and the chromatically filtered images which may be corrected for distortion. Step 3 relates to using the source of luminance to create a final image, respectively.

In one embodiment, a method for selecting luminance for the final image can be performed using the multi-lens camera system, including the following steps: 1. determining the amount of signal levels is an area of the image with the size of at least one pixel, 2. selecting the source of luminance for the said area in the final image according to the said signal level of step 1, and 3. combing the selected sources of luminance to form the final image at the area of the image of step 1.

By using such a method it is possible to dynamically select the source of the luminance and as such improve the signal to noise ratio of the final image in low lighting conditions. Step 1 relates to calculation the amount of light in a scene by using the exposure time and the pixels signal values in one or more of the imaging channels. Step 2 relates selecting the source of luminance at each area that can be one or more pixels in size by choosing the between the broader spectrum channel. Step 3 relates to creating a final image that consists of luminance and chrominance in which the luminance has higher effective resolution or higher signal to noise ratio in the case of low amount of light in the scene, respectively.

When using multi aperture digital cameras, each lens forms an image that is smaller than the size of the sensor or total size of sensors. The resulting products of such a multi aperture digital camera are multiple images that have lower effective resolution, lower than an image captured by a single aperture lens using the same sensor or a single sensor having a pixel count that is equal to the sum of the plurality of sensors. This reduction of resolution can be compensated by use of more pixels but this solution leads to higher price and larger dimensions, which can be undesirable.

In an embodiment of the multi-lens camera system the optical element comprises an integrated optical barrier for blocking light. Such a barrier can be created using a dicing technique, powder blasting, etching, scoring techniques. According to another embodiment canals are created in an optical element using dicing techniques. Preferably, the barriers are created within or on top of a sensor cover substrate.

Optical wafers can have multiple integrated barriers or canals that can be filled with optical absorbing material. The wafer can have multiple canals with surfaces that are coated with absorbing coating. It is also possible to coat different locations on the wafer surface, the coatings at each location configured to transmit a different light spectrum, especially where each location on the wafer is associated with the arrangement of sub images.

The multi-lens camera system can also include two or more lenses wherein each lens comprises one or more optical elements where some or all have a non circular aperture allowing a decrease in distances between the lenses. The largest lens element in each lens has a footprint which is smaller than the size of the image sensor area that is used to collect the light passing through the same lens. In addition some optical elements have a non circular aperture and others have a circular aperture.

The multi-lens camera system further relates to a micro lens for a usage in a multi lens camera for increasing the light collection efficiency of the pixels having more than one center of symmetry. It is preferred that in such a micro lens the number of said centers of symmetry depends on the number of lenses. Each center of symmetry is preferably created opposite a center of an opposite lens, the lens is associated with a sub image which includes the corresponding center of symmetry. In an embodiment the arrangement of said micro lens array is associated with the arrangement of sub images.

The multi-lens camera systems described herein beneficially allow for increasing the effective resolution of a multi aperture camera without the need of using a sensor with more pixels. The multi-lens camera system thus relates to the use of a multi aperture digital camera having at least two different transfer functions, as a function of field, of lenses of the different imaging channels for improving image spatial resolution.

In one embodiment, the multi-lens camera system relates to the use of a multi aperture digital camera having at least two different transfer functions, as a function of field, of lenses of the different imaging channels for improving low light imaging performance.

In an imaging system containing multi apertures as described above, each lens and the area of the sensor in which the lens forms an image on can be referred to as an imaging channel. The digital camera is composed of two or more imaging channels where the imaging lens of each channel can be different than the imaging lens of other channels.

The focal length of a lens is defined by the distance in which the lens will form an image of an object that is positioned at infinity. The lens F-Number is defined as the focal length divided by the entrance pupil diameter which is set by the lens aperture. The maximal achievable modulation transfer function of a lens with a given F-Number is limited by the diffraction effect.

An ideal lens can have the maximal possible modulation transfer function all across its field of view but an actual lens typically does not reach this limit and typically demonstrates a higher modulation transfer function in the center of the field of view. In a system containing multi lenses for imaging the same scene on to a sensor or sensors using different chromatic filtering or with no chromatic filtering, it is proposed to use lenses with different modulation as a function of field of view. Each lens will be designed to have a higher modulation transfer function at a different region of the scene. Using a special algorithm for combining the details captured by all or some of the lenses and their corresponding areas on the sensor will result in a digital image of the complete scene with high modulation transfer function over the complete field of view.

It is also proposed to use lenses that have varying F-Number across the field of view in which for each lens the area that has higher modulation has also a lower F-Number and therefore the limitation of the modulation is higher Using the proposed method above results in a high-resolution image that was composed by extracting specific areas from different channels. The high-resolution image that was composed can be a monochrome image. Converting this image into a color image requires extraction of the color information for each pixel or pixel groups from some or all of images. Dividing an image into color data also known as chrominance and intensity data also known as luminance is achieved using the stitched monochrome image as the luminance source for each pixel and using information from images from 3 or more different channels.

System Overview

The system and method described herein provide high quality imaging while considerably reducing the length of the camera as compared to other systems and methods.

Specifically, one benefit of the multi-lens camera system and method is to improve image capturing devices while maintaining the same field of view. This is accomplished by using 2 or more lenses in a lens array. Each lens forms a small image of a field of view. Each lens transfers light emitted or reflected from objects in the field of view onto a proportional area in the image sensor. The optical track of each lens is proportional to the segment of the image sensor which the emitted or reflected light is projected on. Therefore, when using smaller lenses, the area of the image sensor which the emitted or reflected light is projected on, referred hereinafter as the active area of the image sensor, is smaller. When the image sensor is active for each lens separately, each initial image formed is significantly smaller as compare to using one lens which forms an entire image. One lens camera transfers emitter or reflected light onto the entire image sensor area.

Instead of using a single lens to form a large image covering the complete sensor active area, two or more lenses are used, where each forms a small image covering only a part of the sensor's active area. An image sensor may not have any color mask on its active area; instead each lens will have a color filter integrated within the optical barrel or in front of the lens (between the lens and the scene) or between the lens and the sensor or placed on top of the sensor part that is used with the specific lens.

Figure 2:
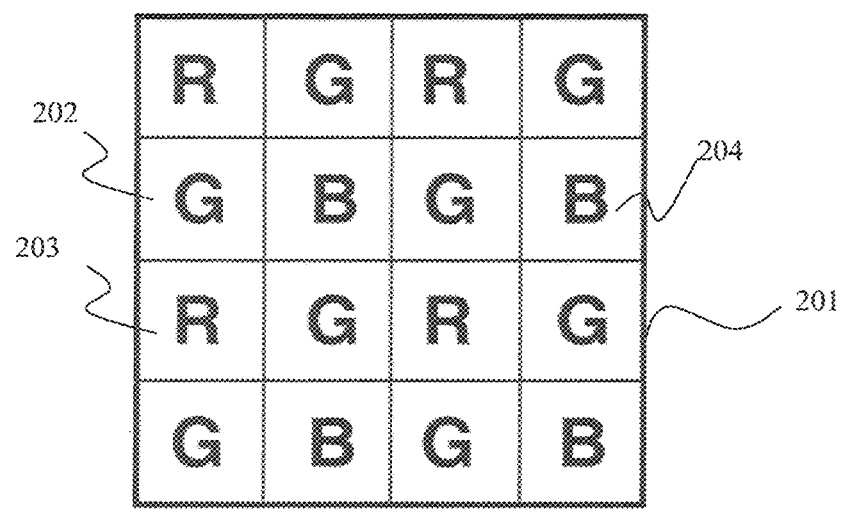
FIG. 2 illustrates a color filter array having multiple pixels, according to one example embodiment.

FIG. 1 illustrates a side view of a single lens camera having a single lens (102) that can include one or more elements and a single sensor (101). FIG. 2 illustrates a sensor array (201) having multiple pixels where the position of the green filter, red filter and blue filter are marked by (202), (203) and (204) respectively. The image that will be taken using this configuration needs to be processed in order to separate the green, red and blue images.

Figure 3:
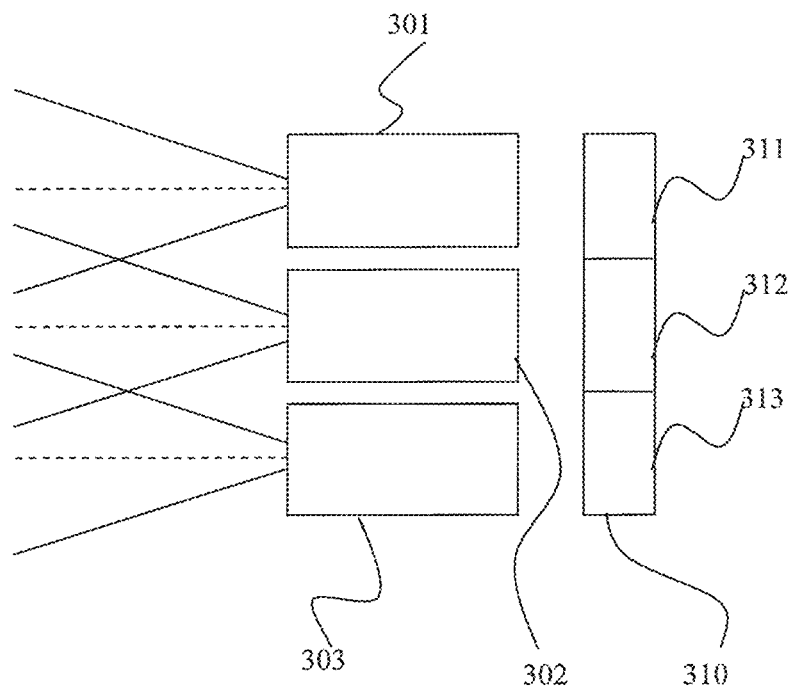
FIG. 3 illustrates a side view of a three lens camera having one image sensor and three lenses, according to one example embodiment.

FIG. 3 illustrates a side view of a three lens camera having one sensor (310) and three lenses (301), (302) and (303). Each one of the said lens will project the image of the same scene on to segments of the sensor marked by (311), (312), and (313) respectively. Each one of the three lenses will have different color filters integrated within the lens, in front of it or between the lens and sensor (310). Using the described configuration the image acquired by the sensor will be composed of two or more smaller images, each imaging information from the scene at different spectrums.

Figure 4:
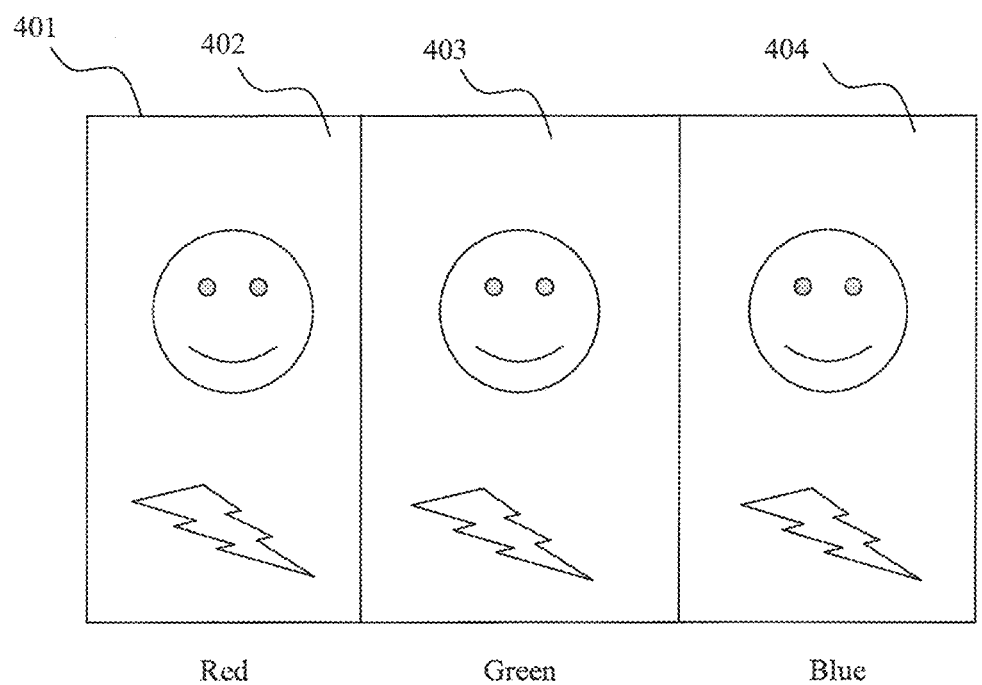
FIG. 4 illustrates an example of a scene as projected on to an image sensor, according to one example embodiment.

FIG. 4 illustrates an example of a scene as projected on to the sensor (401), in each region of the sensor (402), (403) and (404) the same scene is projected but each region will contain information for light at different wavelengths representing different colors according to the filters integrated within the lens that forms the image on each region.

The described configuration does not require the use of a color filter array and therefore the maximal spatial frequency that can be resolved by the sensor can be higher. On the other hand, using smaller lens and smaller active area per channel can result in a smaller focal length of the lens. Therefore, the spatial resolution of objects can be decreased, and the maximal resolvable resolution for each color can remain the same.

The image acquired by the sensor is composed of two or more smaller images, each containing information of the same scene but in different colors. The complete image is then processed and separated in to 3 or more smaller images and combined together to one large color image.

The described method of imaging has many advantages:
1. Shorter lens track (height): Each one of the lenses used can be smaller in size than the single lens covering the same field of view. The total track (height) of each lens can be smaller, allowing the camera to be smaller in height, an important factor for mobile phone cameras, notebook cameras and other applications requiring short optical track.
2. Reduced Color artifacts: Since each color is captured separately, artifacts originating from spatial dependency of each color in a color filter array can be reduced.
3. Lens requirements: Each lens does not have to be optimal for all spectrums used, simplifying the lens design and possibly decreasing the amount of elements used in each lens as no color correction may be needed.
4. Larger Depth of Focus: The depth of focus of a system depends on its focal length. Since smaller lenses are used with smaller focal lengths, the depth of focus is increased by the scale factor, squared.
5. Elimination of focus mechanism: Focus mechanisms can change the distance between the lens and the sensor to compensate for the change in object distance and to assure that the desired distance is in focus during the exposure time. Such a mechanism can be costly and can have many other disadvantages such as increased size, increased power consumption, shutter lag, decreased reliability, and increased price.

Using a fourth lens in addition to the three used for each color red, green and blue (or other colors) with a broad spectral transmission can allow extension of the sensor's dynamic range and can improve the signal-to-noise performance of the camera in low light conditions.

All configurations described above using a fourth lens element can be applied to configurations having two or more lenses.

Another configuration uses two or more lenses with one sensor having a color filter array integrated or on top of the sensor such as a Bayer filter array. In such a configuration no color filter will be integrated in to each lens channel and all lenses will create a color image on the sensor region corresponding to the specific lens. The resulting image will be processed to form one large image combining the two or more color images that are projected on to the sensor.

Dividing the sensor's active area in to 3 areas, one for each of red, green, and blue (for example), can be achieved by placing 3 lenses as illustrated in the figures. The resulting image will include 3 small images containing information of the same scene but chromatically filtered differently.

FIG. 5 illustrates a front view of a three lens camera using one rectangular sensor (500) divided in to three regions (501), (502) and (503). The three lenses (511), (512) and (513) each having different color filters integrated within the lens, in front of the lens or between the lens and the sensor are used to form an image of the same scene but in different colors. In this example each region of the sensor (501), (502) and (503) are rectangular having the longer dimension of the rectangle perpendicular to the long dimension of the complete sensor.

Other three lens configuration can be used, such as using a larger green filtered lens and two smaller lenses for blue and red, such a configuration will results in higher spatial resolution in the green channel since more pixels are being used.

FIG. 6 illustrates a front view of a three lens camera having one sensor (600), one large lens (613) and two smaller lenses (611) and (612). The large lens (613) is used to form an image on the sensor segment marked (603) while the two smaller lenses form an image on the sensor's segments marked with (601) and (602) respectively. The larger lens (613) can use a green color filter while the two smaller lenses (611) and (612) can use a blue and red filter respectively. Other color filters could be used for each lens.

A four lens camera includes 4 lenses each having a different color filter integrated within the lens, in front of the lens, or between the lens and the sensor region corresponding to the lens. The color filter used for two lenses can be the same, resulting in a particular color filter appearing twice among the 4 lenses.

Figure 7:
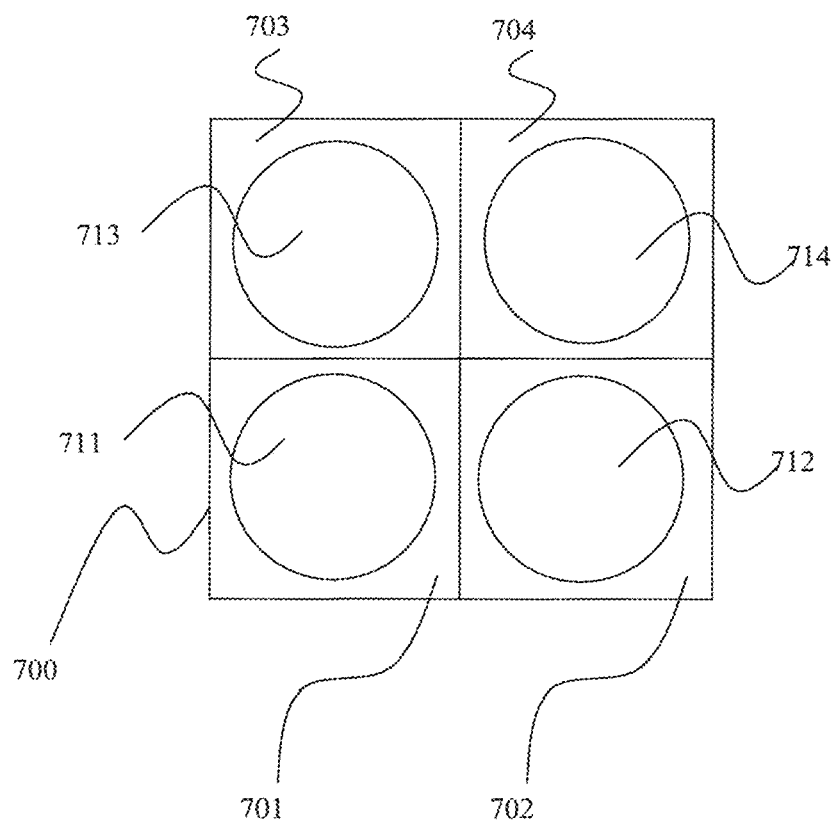
FIG. 7 illustrates a front view of a four lens camera having a one image sensor and four lenses, according to one example embodiment.

FIG. 7 illustrates a front view of a four lens camera having one sensor (700) and four lenses (711), (712), (713) and (714). Each lens forms an image on the corresponding sensor region marked with (701), (702), (703) and (704) respectively. Each one of the lenses will be integrated with a color filter within the lens, in front of the lens, or between the lens and the sensor. All four lenses can be integrated with different color filters, or two of the four lenses can be integrated with the same color filter. For example, two green filters, one blue filter, and one red filter can allow more light collection in the green spectrum.

Figure 8:
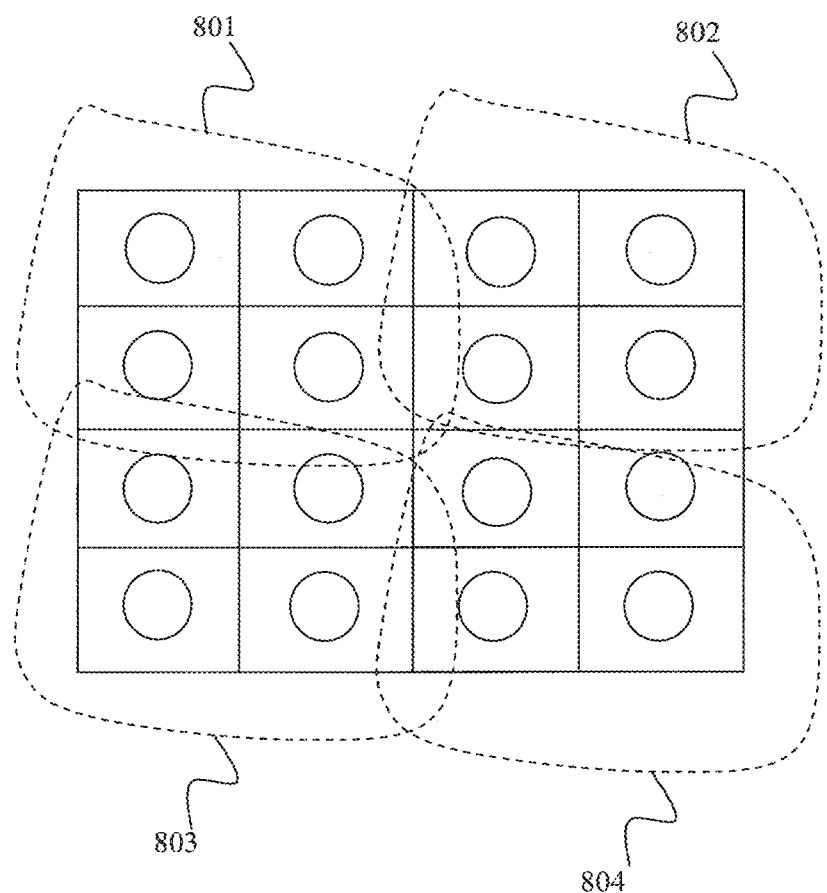
FIG. 8 illustrates a 16 lens camera having four regions, each containing four lenses as illustrated in FIG. 7, according to one example embodiment.

FIG. 8 illustrates a 16 lens camera having 4 regions (801), (802), (803) and (804), each containing four lenses as illustrated in FIG. 7.

Figure 9:
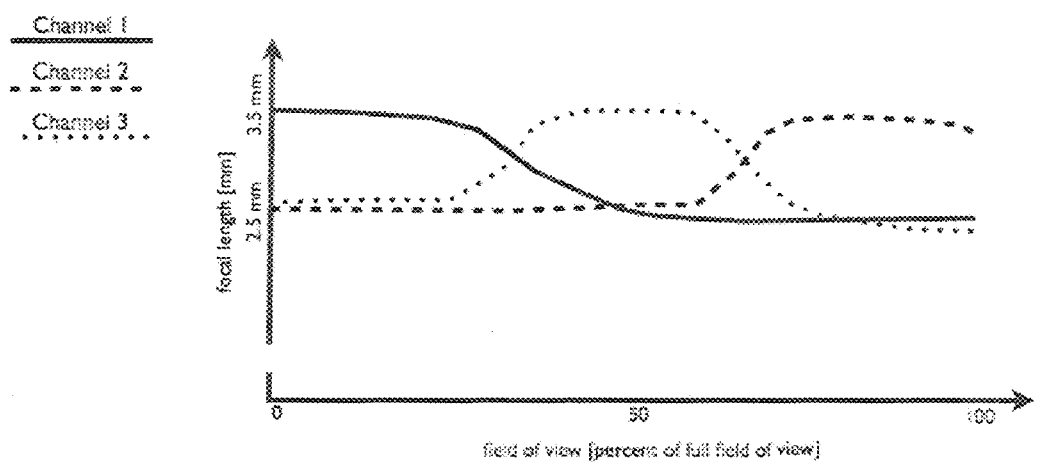
FIG. 9 illustrates a graph of modulation versus field of view at a specific spatial frequency, according to one example embodiment.

A camera system with 3 imaging channels can have a different color filter integrated within each imaging channel, one for each of red, green, and blue. All imaging channels have the same diagonal field of view. In this embodiment, the lenses of the imaging channels were designed to have higher modulation at different areas of the image. The higher modulation is introduced by allowing the modulation of the other areas of the image to decrease. FIG. 9 illustrates a graph of modulation at a specific spatial frequency in which the modulation of each imaging channels is higher at a part of the field of view.

The imaging channel (channel 1 in FIG. 9) including a green color filter demonstrates higher modulation at the center of the field of view, The imaging channel (channel 2 in FIG. 9) including a red color filter demonstrates higher modulation between the central area of the field of view and up to an area close to the corner of the field of view. The imaging channel (channel 3 in FIG. 9) including a blue color filter demonstrates higher modulation at the corner of the field of view.

FIG. 9 illustrates the modulation variation as a function of field of view for the three lenses of the first embodiment. As seen in the graph at any given field of view at least one imaging channel images the scene with a higher modulation.

After capturing images or during image readout, a luminance matrix is created according to one of the two methods:
1. At each area of the final image one or more pixels in size, the source of luminance is chosen from one of the three imaging channels according to a predefined table that for each area selects the source of luminance according to the imaging channel having the highest modulation in the said area, or
2. Comparing sharpness of each area or detail in the three imaging channels and choosing the sharpest one as the source of luminance.

In both cases a chrominance matrix is also created using the images of the three imaging channels.

The luminance and chrominance matrix contain sufficient information as a color image. Converting the luminance and chrominance into other image formats such as RGB, YUV or any other known format is not described here but is a well known procedure.

A camera system with 4 imaging channels can have a different color filter integrated within each imaging channel, one for each of red, green, blue, and white. The white color filter has a wider spectral transmission compared to the other colors. All imaging channels have the same diagonal field of view. In this embodiment, the lenses of the imaging channels that include the red, green, and blue filters were designed to have higher modulation at a different area of the image. Higher modulation is introduced by allowing the modulation of the other areas of the image to decrease. FIG. 9 illustrates a graph of modulation versus field of view at a specific spatial frequency in which the modulation of each imaging channel is higher at a part of the field of view. The white channel can have a near uniform modulation as a function of field of view.

The imaging channel (channel 1 in FIG. 9) including a green color filter demonstrates higher modulation at the center of the field of view. The imaging channel (channel 2 in FIG. 9) including a red color filter demonstrates higher modulation between the central area of the field of view and the area close to the corners of the field of view. The imaging channel (channel 3 in FIG. 9) including a blue color filter demonstrates higher modulation at the corners of the field of view.

FIG. 9 illustrates the modulation variation as a function of field of view for the three lenses of the first embodiment. As seen in the graph at any given field of view at least one imaging channel images the scene with a higher modulation.

After capturing of the images or during the readout a luminance matrix is created according to one of the three methods:
1. At each area of the final image that can be one or more pixels in size, the source of luminance is chosen from one of the three imaging channels according to predefined table that for each area selects the source of luminance according to the imaging channel having the highest modulation in the said area, or
2. Comparing the sharpness of each area or detail in the three imaging channels and choosing the sharpest one as the source of luminance, or
3. Using the image of the imaging channel that includes a white channel.

A smart algorithm can choose to use one of the above three methods for computing the luminance matrix by determining the amount of light in a scene. The amount of light can be estimated by the exposure time and the signals or average signal in the image of one or more imaging channels.

In case of low lighting conditions it is preferred to use the third method of creating the luminance matrix using the white channel only as this channel will demonstrate a higher signal-to-noise ratio which leads to lower noise in the final image. The decision can be done on a global level or on a pixel or area level allowing the use of information from all four imaging channels for creating the luminance matrix. In this case the luminance of bright areas in the scene will be created using one of the three color channels and luminance at darker areas will be created using information from the white channel. In both cases a chrominance matrix is also created using the images of the three imaging channels or using the four channels. The luminance and chrominance matrix contain sufficient information as a color image.

A camera system with 2 imaging channels can include filters that use the same spectrum. One of the imaging channels can be designed to have higher modulation at the central area of the image and the other imaging channel can be designed to have higher modulation at the peripheral area of the image. The higher modulation is introduced by allowing the modulation of the other areas of the image to decrease.

Figure 10:
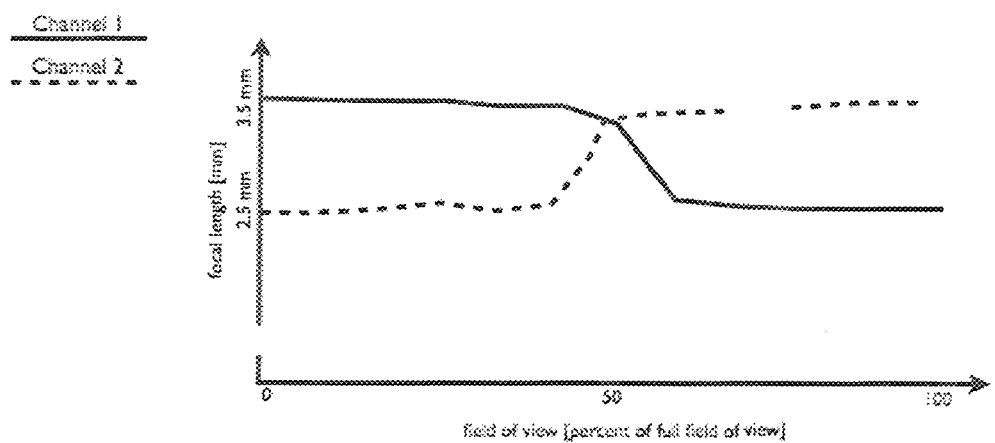
FIG. 10 illustrates a graph of modulation versus field of view at a specific spatial frequency, according to one example embodiment.

FIG. 10 illustrates a graph of modulation versus field of view at a specific spatial frequency, in which the modulation of each imaging channel is higher at a part of the field of view. After capturing the images or during image readout, a combined image is created according to one of the two methods:

1. At each area of the final image that can be one or more pixels in size, the source image is chosen from one of the two imaging channels according to predefined table that for each area selects the source image according to the imaging channel having the highest modulation in the said area, or
2. Comparing sharpness of each area or detail in the two imaging channels and choosing the sharpest one as the source.

Figure 11:
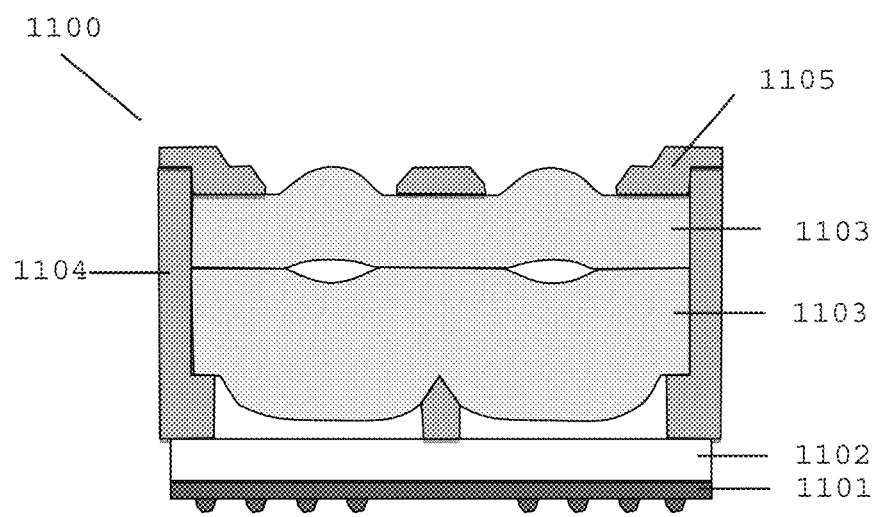
FIG. 11 illustrates an embodiment of a section of a multi-lens digital camera, according to one example embodiment.

FIG. 11 illustrates an embodiment of a section of multi aperture digital camera, i.e. a lens package 1100. The lens package 1100 comprises an image capturing element 1101, e.g. a Charge Coupled imaging Device (CCD) or a CMOS imaging device (the "image sensor" herein). In general such an image capturing element 1101 is referred to as a solid-state image sensor (SSIS). The image capturing element 1101 converts optical images of the subject formed by the lens elements of the lens array 1103 into an image signal (data). The image capturing element 1101 is mounted on a substrate (not shown) and comprises a cover 1102 for protecting the sensor against the environment. The lens array 1103 is housed in a lens holder 104, and the lens holder 1104 is provided with a cover plate 1105. The lens holder 1104 has the function of a spacer as well, because the lens array 1103 is supported by the lens holder 1104. The height of this support determines for a dominant part the distance between the lens array 1103 and the sensor 1101. The cover plate may include optionally baffle. Light falls into the cover plate 1105 and travels through the lens array 1103 to the sensor 1101. The individual parts may be bonded by an adhesive layer (not shown). Preferably, the one or more adhesive layers are rim-shaped, the adhesive material being present outside an area coinciding with the projection of the circumference of the lens elements present in the lens array.

Figure 12:
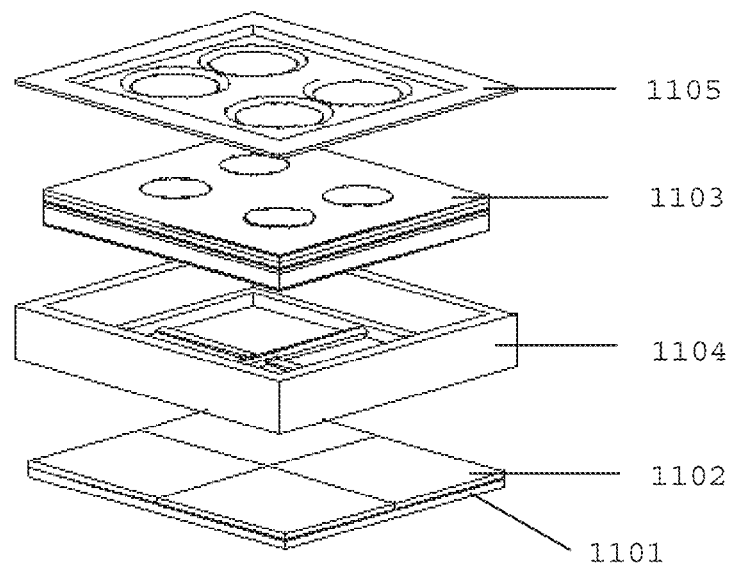
FIG. 12 illustrates an exploded view of the individual camera components shown in FIG. 11, according to one example embodiment.

FIG. 12 illustrates an exploded view of the individual parts shown in FIG. 11.

Figure 13:
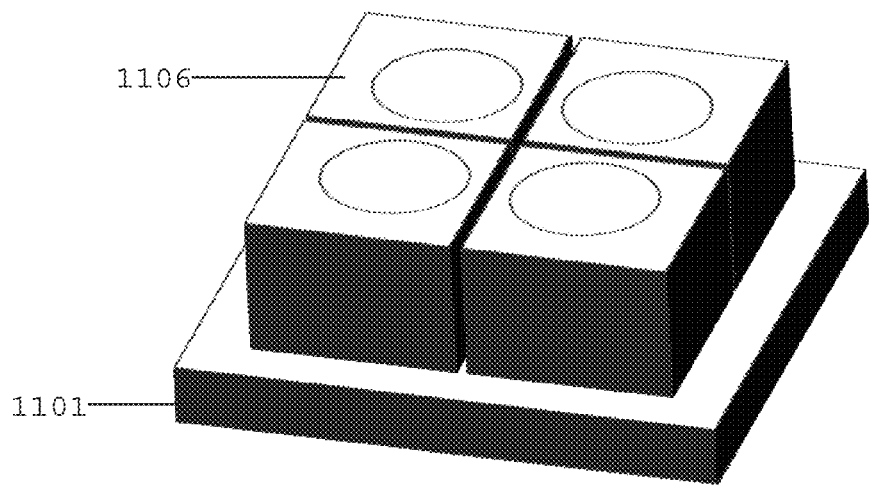
FIG. 13A illustrates individual lens elements in a 2×2 lens array, according to one example embodiment.
FIG. 13B illustrates a top view of the 2×2 lens array shown in FIG. 13A, according to one example embodiment.
Figure 13:
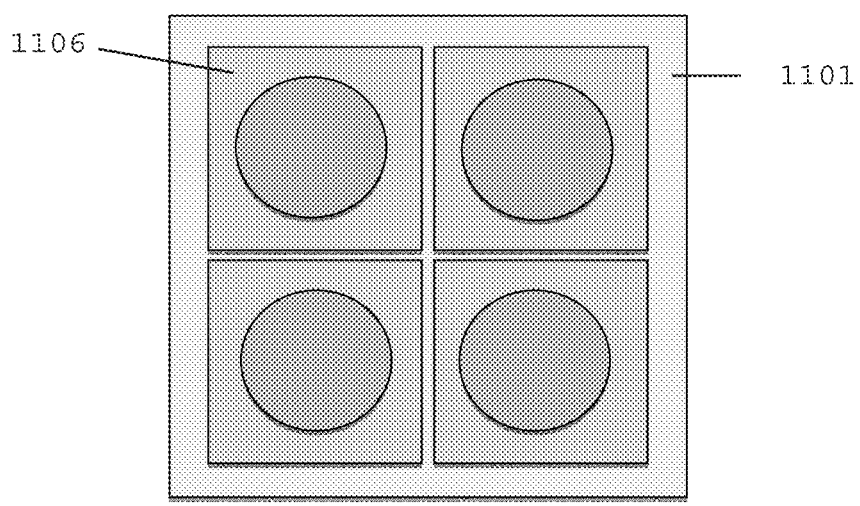

FIG. 13A illustrates individual lens elements 1106 in a 2×2 array placed on a sensor 1101.

FIG. 13B illustrates a top view of the 2×2 array shown in FIG. 13A.

Figure 14:
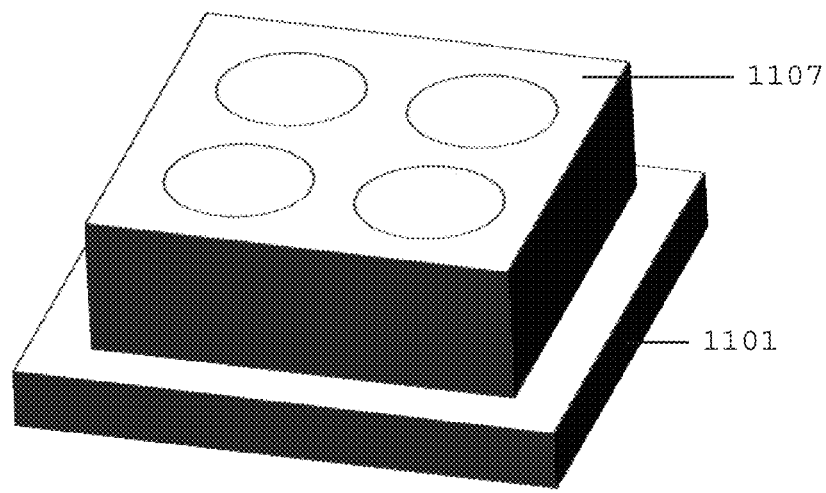
FIG. 14A illustrates one lens element in a 2×2 lens array integrated lens element, according to one example embodiment.
FIG. 14B illustrates a top view of the integrated 2×2 lens array shown in FIG. 14A, according to one example embodiment.
Figure 14:
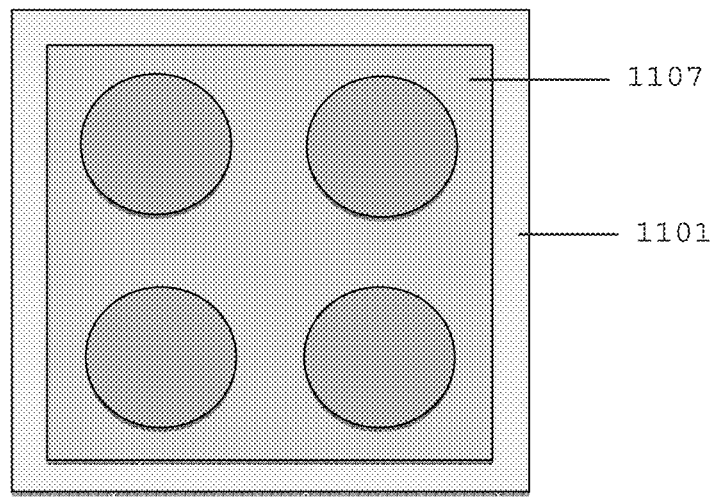

FIG. 14A illustrates one lens element 1107 in a 2×2 array, i.e. a 2×2 integrated lens element placed on a sensor.

FIG. 14B illustrates a top view of the integrated 2×2 array shown in FIG. 14A. It should be noted that the multi-lens camera systems described herein are not restricted to a 2×2 array construction. Any N×M configuration of lenses can be used as well according to principles described herein.

FIGS. 15A, 16A, and 17A, 18, 19 illustrate a construction of different sizes of the lenses 1106 in a lens array.

Figure 15:
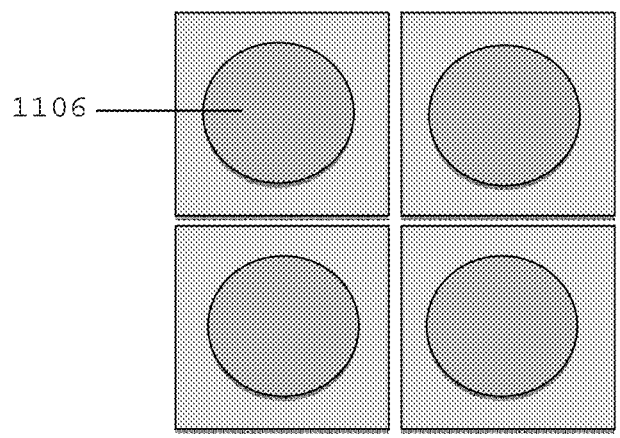
FIGS. 15A, 16A, 17A, 18, and 19 illustrate various multi-lens arrays, according to one example embodiment.
FIGS. 15B, 16B, and 17B illustrate image sensors for use with the multi-lens arrays of FIGS. 15A, 16A, and 17A, respectively, according to one example embodiment.
Figure 15:
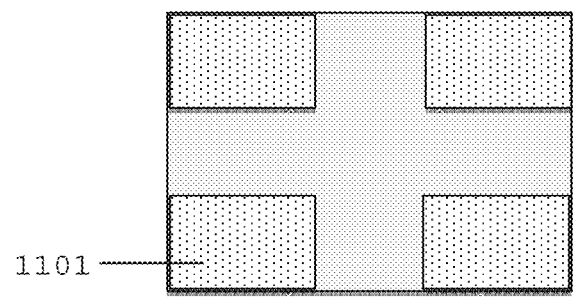
Figure 16:
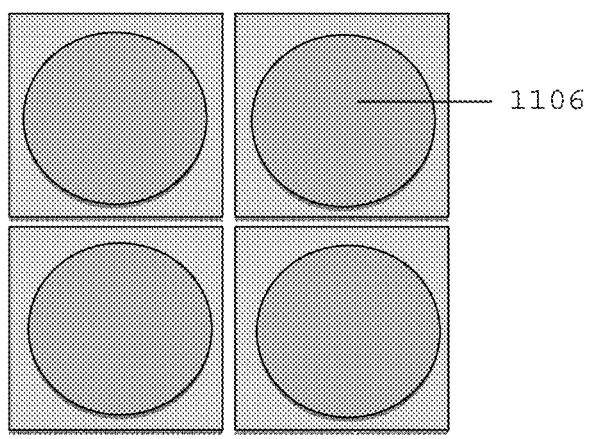
Figure 16:
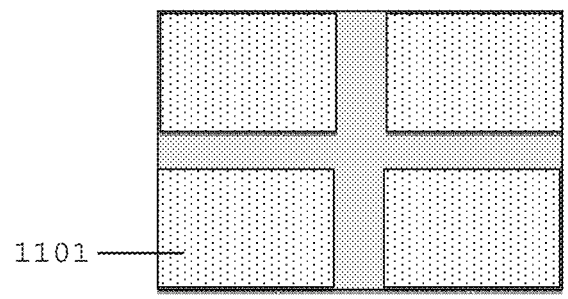
Figure 17:
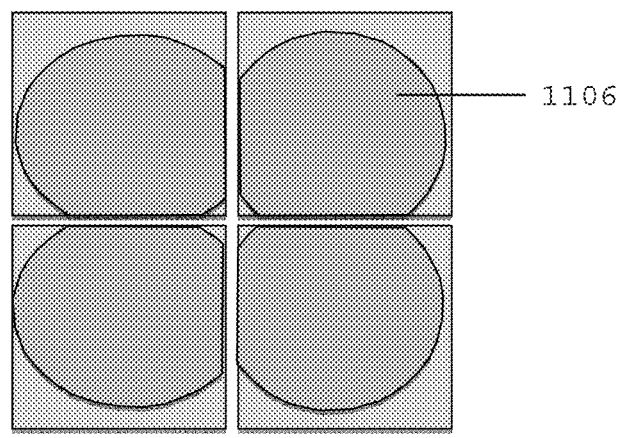
Figure 17:
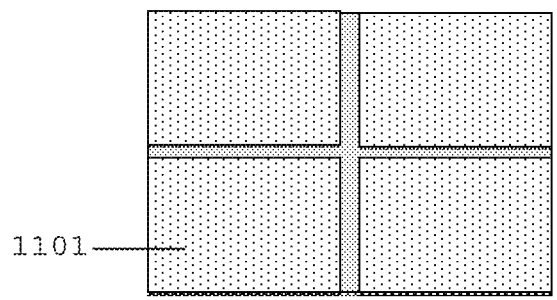
Figure 18:
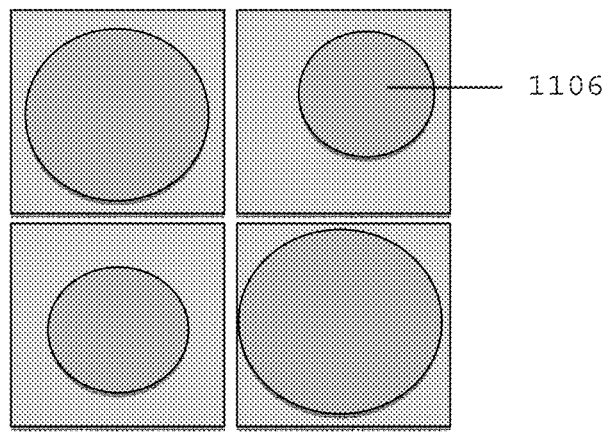
Figure 19:
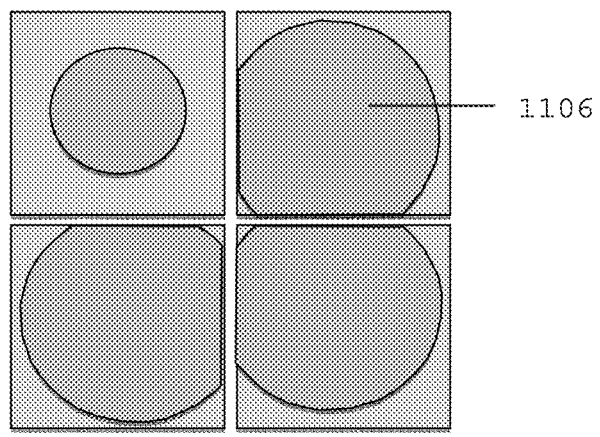

FIGS. 15B, 16B, and 17B illustrate the sensors 1101 to be used in connection with the lenses shown in FIGS. 15A, 16A, and 17A, respectively.

Figure 20:
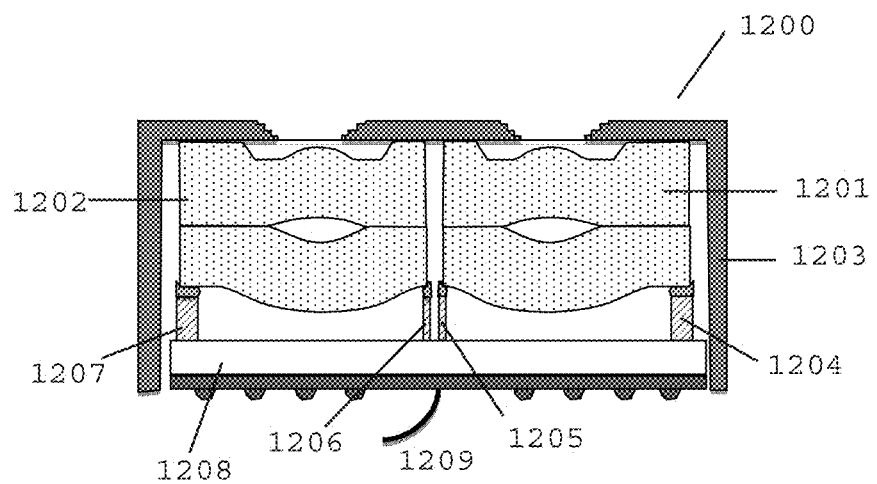
FIGS. 20, 21, 22, and 23 illustrate multi-lens camera components, according to one example embodiment.

FIG. 20 illustrates another embodiment of a section of multi aperture digital camera, i.e. a lens package 1200. Individual arrays 1201, 1202 comprising lens elements are positioned within a housing 1203, and spacers 1204, 1205, 1206, 1207 are located on the sensor cover 1208 mounted on sensor 1209. The bonding between the spacers 1204, 1205, 1206, 1207 and the sensor cover 1208 is through an adhesive. An adhesive is also present between the spacers 1204, 1205, 1206, 1207 and the respective arrays 1201, 1202.

Figure 21:
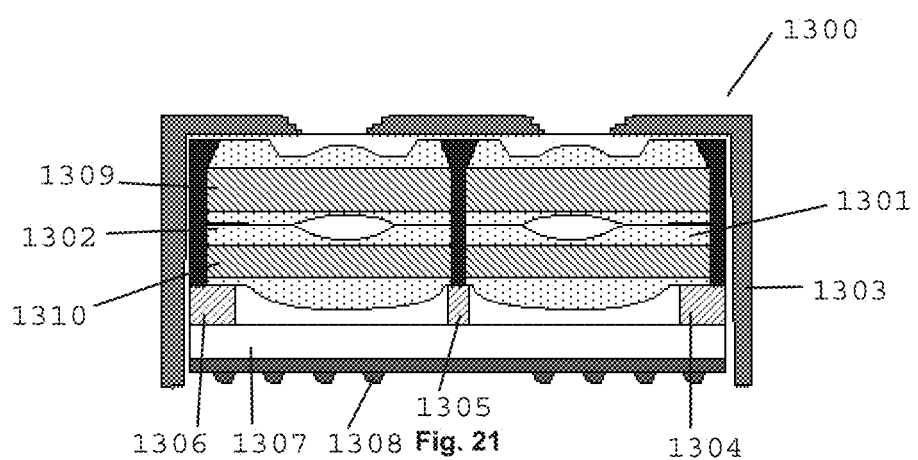

FIG. 21 illustrates another embodiment of a section of multi aperture digital camera, i.e. a lens package 1300. Individual arrays 1301, 1302 comprising lens elements are positioned within a housing 1303, and spacers 1304, 1305, 1306 are located on the sensor cover 1307 being mounted on sensor 1308. The bonding between the spacers 1304, 1305, 1306 and the sensor cover 1307 is through an adhesive. An adhesive is also present between the spacers 1304, 1305, 1306 and the arrays 1301, 1302. The polymer based lens elements are provided on transparent substrates 1309, 1310 via replication technology. Examples of transparent substrates are glass, polymers, quartz, ceramics, sapphire, crystalline alumina, Yttria, yttrium aluminium garnet (YAG). The lens package 1300 also includes light-shielding walls for preventing crosstalk between light beams passing through adjacent lens elements of the lens array 1301, 1302. The replicated lenses may be provided with one ore more additional layers, such as color filters, diaphragms, infra red reflecting layers, and anti reflection layers (not shown). These additional layers can be present between the substrates 1309, 1310 and the lens element replicated thereon. The lens elements of the lens array 1301, 1302 can have different shapes, thicknesses, air space thicknesses, polymer materials and aperture dimensions.

Figure 22:
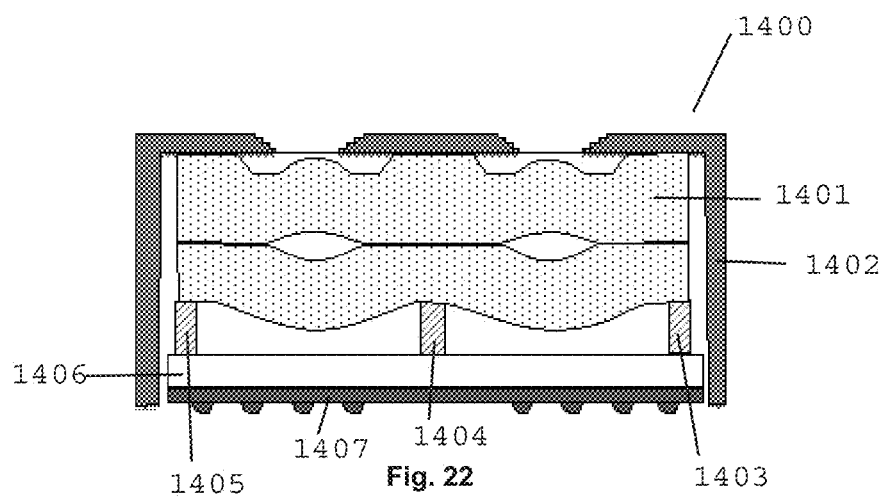

FIG. 22 illustrates another embodiment of a section of multi aperture digital camera, i.e. a lens package 1400. Array 1401 comprising lens elements is positioned within a housing 1402, and spacers 1403, 1404, 1405 are located on the sensor cover 1406 being mounted on sensor 1407. The bonding between the spacers 1403, 1404, 1405 and the sensor cover 1406 is through an adhesive. An adhesive is also present between the spacers 1403, 1404, 1405 and the array 1401.

Figure 23:
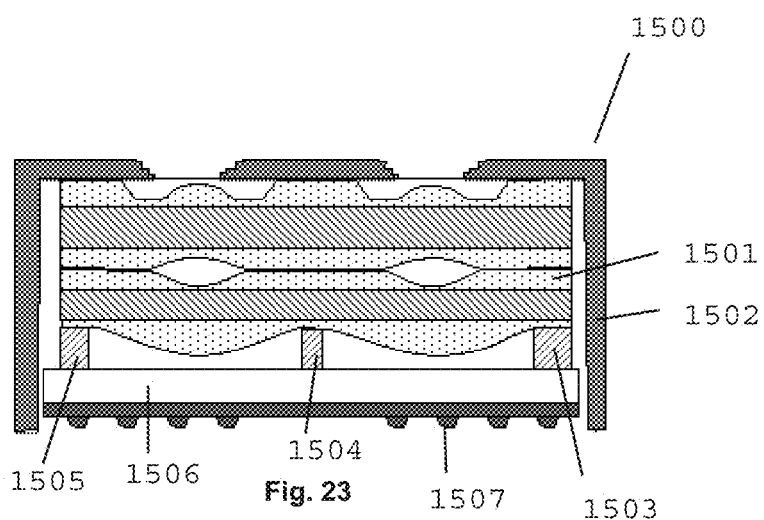

FIG. 23 illustrates another embodiment of a section of multi aperture digital camera, i.e. a lens package 1500. Array 1501 comprising lens elements is positioned within a housing 1502, and spacers 1503, 1504, 1505 are located on the sensor cover 1506 being mounted on sensor 1507. The bonding between the spacers 1503, 1504, 1505 and the sensor cover 1506 is through an adhesive. An adhesive is also present between the spacers 1503, 1504, 1505 and the array 1501. The polymer based lens elements are provided on transparent substrates 1508, 1509 via replication technology. Examples of transparent substrates are glass, polymers, quartz, ceramics. sapphire, crystalline alumina, Yttria, yttrium aluminium garnet (YAG).

The replica layer used in the multi-lens camera system can be composed of a UV curable polymer, selected from the group of polycarbonates, polystyrenes, poly(meth)acrylates, polyurethanes, polyamids, polyimide, polyethers, polyepoxides and polyesters. A replica layer is obtained by using a replication method in which use is made of a mould having a precisely defined surface, for example an aspherical surface, wherein a small amount of a radiation-curable resin, for example a UV curable resin, is applied to the mould surface. Subsequently, the resin is spread over the mould surface, so that the cavities present in the mould are filled with the resin, whereupon the whole is subsequently irradiated for curing the resin and the thus cured product is removed from the mould. The cured product is a negative of the mould surface. An advantage of the replication process is that lenses having an intricate refractive surface, such as an aspherical surface, can be produced in simple manner, without complicated processes of grinding and polishing the lens body being required. In addition to that, the replica layer is durably joined to the surface to which the replica layer is applied, without adhesives being used. In addition, there is no occurrence of so-called "air gaps", which lead to large refractive index transitions between the surface and the air layer that is present.

Suitable UV curable compositions are: polycarbonates, including diethylene glycolbis-(allyl)carbonate, polystyrenes, including polychlorine styrene, polyacrylates, such as poly(trifluoroethyl methacrylate), poly(isobutyl methacrylate), poly(methylacrylate), poly(methyl methacrylate), poly(alphamethyl bromium acrylate), poly(methacrylic acid)-2,3-dibromium propylpoly(phenyl methacrylate poly(pentachlorine phenyl-methacrylate polymer), polyester compounds such as diallylphthalate, poly(vinyl-benzoate), poly(vinylnaphthalene), poly(vinylcarbazole) and silicones in the form of various types of resin materials, as well as acrylic resin, urethane resin, epoxy resin, enthiol resin or thiourethane resin or photopolymer.

Exposure preferably takes place with an intensity of between 100 en 2000 W/cm<2>, in particular 700 W/cm<2>, and a dose of 1-15 J/cm<2>, in particular 7 J/cm<2>, a wavelength in the 320-400 nm range and an exposure time of 1-60 seconds, in particular 10 seconds.

Suitable UV curable adhesive compositions include GAFGARD233 (marketed by DuPont, type vinylpyrrolidone), Norland Inc. NOA-61, NOA-63, NOA-65, Three bond AVR-100 and Sony Chemical UV-1003, possibly provided with the usual additives such as initiators, reactive or non-reactive dilutants, crosslinking agents, fillers, pigments and anti-shrinkage agents.

Spacers mentioned in the Figs. are made of a rigid material, for example glass, silicon or a composite material such as FR4. In an embodiment the spacer plate is so configured that it will not interfere with the light path through the two separate lens elements, The spacer plate comprises an opening which is positioned coaxially with a main optical axis of the lens element in question, whilst in a special embodiment the side of said opening is provided with an anti-reflective coating.

The color filters, Infrared blocking filters, apertures and antireflection coatings on the substrates or lens surfaces can be manufactured according to well known industrial processes, like coating processes chemical vapor deposition, physical vapor deposition.

Suitable technologies regarding a multi-aperture camera through assembling discrete optical elements, lens housing and optical blocking structures are disclosed in U.S. Patent Publication Nos. 2010/0127157 and US2010/0039713. These documents are incorporated by reference herein. The optical elements can be manufactured through injection molding, glass molding of a thermoplast, or by pressing a glass preshape in a single cavity or plural cavity mold.

Suitable technologies for manufacturing coverplates lens holders for wafer level optics camera are disclosed in U.S. Patent Publication Nos. 2010/0052192, 2009/0321861, and 2010/0117176, which are incorporated by reference herein.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A multi-lens camera system, comprising:
a digital image capturing unit comprising:
a first lens configured to:
capture a scene based on a field of view of the first lens; and
direct light collected from a first portion of the scene at a first focal length and a second portion of the scene at the first focal length onto a first image sensor portion according to a first modulation transfer function to form a first image, wherein the first lens system is associated with the first modulation transfer function representative of the sharpness of collected light directed by the first lens and a field curvature of the first lens, and wherein the first modulation transfer function provides a greater average sharpness of light collected from the first portion of the scene than it provides from the second portion of the scene;
a second lens configured to:
capture the scene based on a second field of view of the second lens that has a substantially same field of view as the first lens; and
direct light collected from the first portion of the scene and the second portion of the scene onto a second image sensor portion according to a second modulation transfer function to form a second image, wherein the second lens is associated with the second modulation transfer function representative of the sharpness of collected light directed by the second lens and a field curvature of the second lens, and wherein the second modulation transfer function provides a greater average sharpness of light collected from the second portion of the scene than it provides from the first portion of the scene; and an image sensor system comprising the first image sensor portion and the second image sensor portion and configured to capture light incident upon the first image sensor portion and the second image sensor portion to combine the first portion of the scene from the first image and the second portion of the scene from the second image to form a third image of the scene, wherein the first modulation transfer function provides a greater average sharpness of light collected from the first portion of the scene than the second modulation transfer function, and wherein the second modulation transfer function provides a greater average sharpness of light collected from the second portion of the scene than the first modulation transfer function.

2. The system of claim 1, wherein the first and the second modulation transfer functions improve spatial resolution of different-designated portions of the third image representative of the first and the second portions of the scene, respectively.

3. The system of claim 1, wherein the first and the second modulation transfer functions are based upon resolution variances determined by a function of location within the first and the second field of view, respectively.

4. The system of claim 3, wherein the function of location within the first and the second field of view are based on the optical properties of the first and second lenses, and wherein the optical properties comprise one or more of: lens shape, lens thickness, air space thickness, lens material, and aperture dimensions.

5. The system of claim 1, wherein at least one of the first and second lenses includes a neutral density filter.

6. The system of claim 1, wherein at least one of the first and second lenses includes a chromatic filter.

7. The system of claim 1, wherein at least one of the first and second lenses includes a polarizing filter.

8. The system of claim 1, wherein the image sensor system is further configured to create a luminance matrix for the third image of the scene according to the first and the second modulation transfer function to improve modulation across the scene for the luminance matrix.

9. The system of claim 8, wherein the image sensor system is further configured to select a source of luminance for a portion of the luminance matrix according to the lens of the image capturing unit that has the highest modulation for a corresponding portion of the third image of the scene.

10. The system of claim 1, wherein the image sensor system is further configured to create a chrominance matrix for each image portion of the third image of the scene according to the first and the second modulation transfer function to improve modulation across the scene for the chrominance matrix.

11. A method for improving image spatial resolution using a multi-lens camera, comprising:

capturing light corresponding to a scene and received through a first lens of the multi-lens camera based on a first field of view configuration, the captured light comprising: light representative of a first portion of the scene at a first focal length and at a first average sharpness; and light representative of a second portion of the scene at the first focal length and at a second average sharpness, wherein the first lens is associated with a first modulation transfer function representative of a field curvature of the first lens, and wherein the first average sharpness is greater than the second average sharpness;

capturing light received corresponding to the scene through a second lens of the multi-lens camera based on a second field of view configuration that is substantially the same as the first field of view configuration, the captured light comprising: light representative of the first portion of the scene at a third average sharpness that is less than the first average sharpness; and a light representative of the second portion of the scene at a fourth average sharpness that is greater than the second average sharpness, wherein the second lens is associated with a second modulation transfer function representative of a field curvature of the second lens, and wherein the fourth average sharpness is greater than the third average sharpness; and generating an image, using the multi-lens camera, representative of the captured light according to the first and the second modulation transfer function, the image comprising a first image portion including the captured light received through the first lens representative of the first portion of the scene and a second image portion including the captured light received through the second lens representative of the second portion of the scene.

12. The method of claim 11, wherein selection of a source of luminance of the first image portion is based on the first modulation transfer function and the second modulation transfer function.

13. The method of claim 11, wherein selection of a source of chrominance for the first image portion is based on the first modulation transfer function and the second modulation transfer function.

14. The method of claim 11, wherein generating an image representative of the captured light comprises upscaling light information representative of the captured light received through the first lens and the captured light received through the second lens and generating the image based on the upscaled light information.

15. The method of claim 11, wherein the first and the second modulation transfer functions are based upon resolution variances determined by a function of location within the first and the second field of view, respectively.

16. The method of claim 11, wherein the first and the second modulation transfer functions improve spatial resolution of different designated image portions of the image.

17. A method for improving image spatial resolution using a multi-lens camera, comprising:

capturing light corresponding to a scene and received through each of a plurality of lenses of a digital image capturing unit, wherein the captured light is representative of a plurality of portions of the scene at a first focal length, wherein each lens is associated with a modulation transfer function representative of a field curvature of that lens, wherein at least two of the lenses of the plurality of lenses have the same field of view, wherein a first one of the lens's respective modulation transfer function provides a greater average sharpness of light collected from a first portion of the plurality of portions of the scene than it provides from a second portion of the plurality of portions of the scene, and wherein a second one of the lens's respective modulation transfer function provides a greater average sharpness of light collected from the second portion of the plurality of portions of the scene than it provides from the first portion of the plurality of portions of the scene;

selecting, using the digital image capturing unit, for each of the plurality of portions of the scene, an associated lens based on a luminance of the captured light received through each lens and the modulation transfer function for each lens; and generating an image of the scene, using the digital image capturing unit, comprising a plurality of image portions, each image portion corresponding to a respective portion of the scene obtained from the lenses, wherein a source of luminance of each image portion is based on the sharpness provided by the respective modulation transfer function for each lens in the respective image portion, and wherein the generated image of the scene has a greater average sharpness than the light captured by any individual one of the plurality of lenses.

18. The method of claim 17, wherein the source of luminance for each image portion is used to create a luminance matrix for the image of the scene to improve modulation across the scene for the luminance matrix.

19. The method of claim 17, further comprising creating a chrominance matrix for the image of the scene according to the first and the second modulation transfer functions of the plurality of lenses to improve modulation across the scene for the chrominance matrix.

20. The method of claim 17, wherein the modulation transfer functions are based upon resolution variances determined by a function of location within a field of view.

* * * * *